Sept. 28, 1943.  W. B. REPPMANN  2,330,625

FILTER

Filed May 1, 1940

Inventor
Wilhelm B. Reppmann
By [signature] Atty.

Patented Sept. 28, 1943

2,330,625

UNITED STATES PATENT OFFICE 2,330,625

FILTER

Wilhelm Benjamin Reppmann, Oss, Netherlands; vested in the Alien Property Custodian Application May 1, 1940, Serial No. 332,822 In the Netherlands May 15, 1939

5 Claims. (Cl. 210—177)

This invention relates to improvements in filters.

In filtering processes it often occurs that the sediment deposited on the carrier or filtering medium, for instance filtering cloth, still contains much liquid. Till now it has been usual to remove the sediment from the filter and then to recuperate the liquid out of this sediment.

However, this process is rather intricate and moreover much of the liquid is lost by doing so.

The general object of the present invention is a convenient filter construction by means of which it is possible to obtain a better separation of the filtrate out of the raw material.

A further object is a filter in which the whole of the filter surface is constantly used.

Another object is to provide for an easy and quick cleaning of the filter.

Still another object is to arrange a large filtering area within a small space and to allow the filtering operation to take place under pressure in a closed space.

With the above and other objects in view the invention consists in a product embodying the novel and improved features, constructions and combinations of parts hereinafter described, and particularly pointed out in the claims, the advantages of which will be readily understood and appreciated by those skilled in the art.

In the drawing.

Similar parts are represented by the same reference characters.

Figure 1:
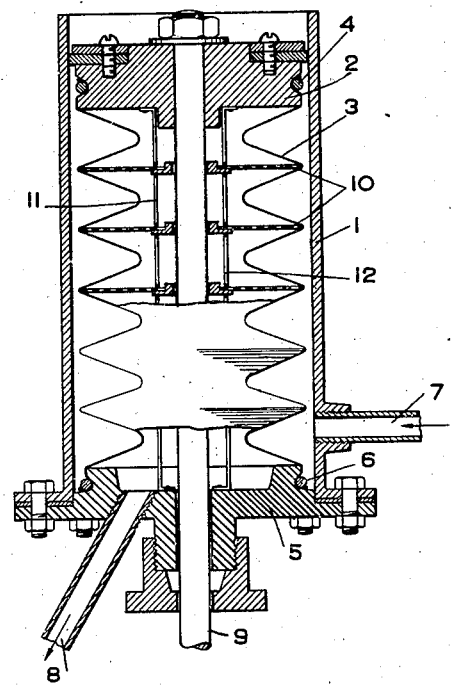
Figs. 1 and 2 are vertical sectional views (partly in elevation) of two different embodiments of the invention.

Fig. 1 represents the preferred embodiment of the invention. The casing 1 is preferably cylindrical although other shapes are possible. The cylindrical shape is preferred because it is most suitable for cooperating with a steam or liquid jacket, such that materials can also be filtered in a heated condition. The carrier 3, which generally consists of a suitable cloth is likewise cylindrical and usually is already in a folded condition when filtering, in order to provide for a large filter surface. This carrier 3 is attached at one of its ends to a piston 2 by means of an elastic ring 4 and at its other end to the cover 5 of the casing 1, likewise by means of an elastic ring 6. The raw material is supplied through the inlet 7 and the clear liquid is exhausted through the outlet 8. The piston rod 9 is guided in a gland and part of the cover 5 and serves in this case also as a guide for disc shaped filter plates 10, which are constructed as indicated in detail in the Figures 3 and 4. The plates are interconnected and spaced by means of tapes or ribbons 11 and 12, which keep the plates at the required mutual distances, when the piston 2 is moved towards its top position in Fig. 1.

Keeping the filter plates in the required position can also be effected in other manners, for instance by arranging springs between the plates, the said springs having when being compressed a height equal to the thickness of a layer of pressed out sediment. The connection by means of the tapes however, is very easy and effective.

For removing the sediment and cleaning the filter it will be sufficient to loosen the cover 5 from the casing and to stretch the carrier 3. The filter cake is then easily broken up and removed from the carrier 3.

Figure 2:
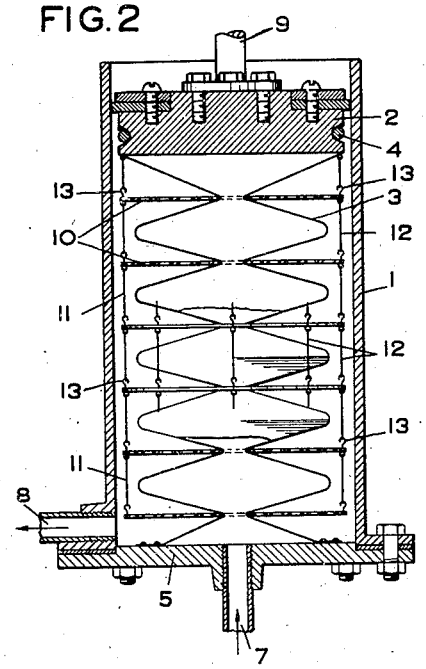

The filter plates 10 can be guided otherwise than by means of the piston rod 9 and they can also be arranged in another manner. This is illustrated in Fig. 2. The filter plates 10 in this case are ring-shaped and extend from the exterior into the folds of the filter cloth 3. In this embodiment tapes or straps 11, 12 are provided by means of which the plates are interconnected in the same way as the slats of a Venetian blind. The inlet of the raw material is arranged centrally at 7 and the outlet of the filtrated liquid is at 8.

On account of the piston rod 9 being arranged outside the casing more space is left in the interior hereof so that a larger area of filtering cloth can be arranged in the filter. When pressing out the liquid out of the sediment the inlet opening 7 is closed and the piston 2 is pressed downwardly. For cleaning the filter of its sediment the cover 5 is taken off and the casing 1 is also taken off so that the filtering cloth is readily accessible. Thereupon the tapes 11, 12 are detached at their points of attachment 13 and the filter cloth can be stretched, so that the sediment can be easily removed from the interior thereof.

The plates 10 must be adapted to let the liquid pass in an easy manner. To this end they are provided with a large number of slits.

Figure 3:
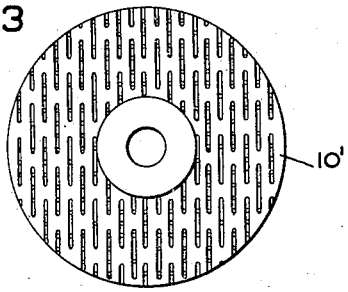
Fig. 3 is a front view of a filter plate.
Figure 4:
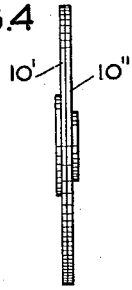
Fig. 4 is a side view of Fig. 3.

In Figs. 3 and 4 a preferred embodiment of a filter plate is represented which satisfies the above-mentioned requirement and is moreover resistant and reliable. Such a plate is composed of two plates 10' and 10" each of which is provided with a set of slits, the said plates being, however, secured to each other in such a manner, that the slits cross another at an angle of e. g. 90° or less.

The interesting feature of this plate is that liquid can flow through the plate from either side thereof, thereby following a zig-zag path. The plates 10' and 10" can be made identical and they are easier to manufacture than plates having radial slits, which moreover are not so resistant as those according to Figs. 3 and 4 on account of the slits extending up to the periphery.

Figure 5:
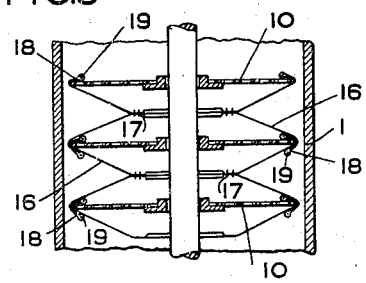
Fig. 5 is a fragmentary sectional view of an element of the sediment carrier.
Figure 6:
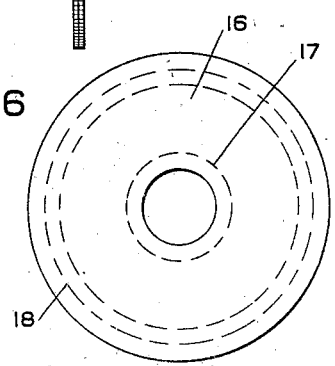
Fig. 6 is a plan view of the element represented in Fig. 5.

In Figs. 5 and 6 is represented a preferred construction of a filter cloth or carrier. This carrier comprises a series of ring-shaped parts 16, which two by two are connected at their inner edges 17 by a stitch line and which at the periphery are laid around the edges of the filter plates 10. The outer peripheral line of these parts is provided with a seam 18 in which a draw cord 19 is inserted. In Fig. 6 such an individual element is represented when it is spread out at the moment of being laid around the edge of a filter plate and of course the draw cord is kept loose. After the cloth has been laid around the edge of a filter plate the draw cord is tightened, so that the cloth is held readily in place. At the edge of each filter plate two edges of the cloth element are laid above one another, as shown in Fig. 5. Such a carrier can be readily mounted and demounted.

It is to be understood that the invention is not limited to the particular constructions and arrangements of parts of the illustrated embodiment of the invention, but that the invention may be embodied in other forms within the scope of the claims.

Having explained the nature and objects of the invention and having specifically described constructions embodying the invention, what I claim is:

1. A filter comprising a casing having an inlet for material to be filtered and an outlet for the filtrate, a zig-zag foldable cylindrical filter-fabric carrier of filter fabric for the filter sediment in said casing, members to which the ends of the carrier are secured in a liquid tight manner, said members being movable towards each other for pressing out the carrier and the sediment deposited thereon, disc-shaped perforated plates arranged in the interior and in the folds of the carrier, and flexible means for spacing and guiding said plates, the inlet being connected with the space between the carrier and the casing and the outlet being connected with the space in the cylindrical carrier.

2. A filter comprising a casing having an inlet for material to be filtered and an outlet for the filtrate, a zig-zag foldable cylindrical filter-fabric carrier of filter fabric for the filter sediment in said casing, members to which the ends of the carrier are secured in a liquid tight manner, said members being movable towards each other for pressing out the carrier and the sediment deposited thereon, disc-shaped perforated plates arranged in the folds of said carrier and in the space between the carrier and the casing, flexible means for spacing and guiding said plates, the inlet being connected with the space in the cylindrical carrier and the outlet being connected with the space between the carrier and the casing.

3. A filter comprising a casing having an inlet for material to be filtered and an outlet for the filtered fluid, a zig-zag foldable carrier of filter fabric, relatively movable end closure members for the carrier, and filter plates provided with two sets of slits arranged at an angle, the slits being situated in different planes in such a manner that the slits of one set are in communication with those of the other set, the said plates being arranged in folds of the carrier, means for guiding the plates and means for moving the plates relative to each other.

4. A filter comprising a casing closed at the ends, having an inlet for material to be filtered and an outlet for the filtrate, a pleated carrier of filter fabric arranged in said casing and interposed between the inlet and outlet and perforated plates extending into the pleats of the carrier, means for guiding said plates in the direction of the length of the carrier and means for moving the plates together with the pleats of the carrier relative to each other.

5. A carrier element for use in combination with a filter according to claim 4, comprising two ring-shaped parts made of filter material, the inner edges of said rings being connected together by a stitch line and draw cords arranged in the outer edges.

WILHELM BENJAMIN REPPMANN.